(12) United States Patent
McGhie et al.

(10) Patent No.: US 7,686,320 B1
(45) Date of Patent: Mar. 30, 2010

(54) STEERING SYSTEM FOR A TRACTOR AND TRAILER

(76) Inventors: James R. McGhie, 93 Teton Pines, Henderson, NV (US) 89074; Robb I. McGhie, 8400 S. Maryland Pkwy., No. 1059, Las Vegas, NV (US) 89123

( * ) Notice: Subject to any disclaimer, the term of this patent is extended or adjusted under 35 U.S.C. 154(b) by 227 days.

(21) Appl. No.: 12/082,618

(22) Filed: Apr. 12, 2008

Related U.S. Application Data

(60) Provisional application No. 60/931,431, filed on May 23, 2007.

(51) Int. Cl.
*B62D 13/02* (2006.01)
*B62D 12/02* (2006.01)

(52) U.S. Cl. .............. 280/442; 280/443; 280/444; 280/445; 280/419; 280/426; 180/418

(58) Field of Classification Search ............ 280/442, 280/443, 445, 444, 419, 426
See application file for complete search history.

(56) References Cited

U.S. PATENT DOCUMENTS

| | | | | |
|---|---|---|---|---|
| 4,221,398 A * | 9/1980 | Pautrat | ............. | 280/444 |
| 4,441,730 A * | 4/1984 | Damm | ............. | 280/426 |
| 4,982,976 A * | 1/1991 | Kramer | ............. | 280/426 |
| 5,183,283 A * | 2/1993 | Jarlsson | ............. | 280/426 |
| 6,129,170 A * | 10/2000 | Hickman et al. | ............. | 180/418 |
| 6,131,691 A * | 10/2000 | Morch | ............. | 180/418 |
| 6,796,572 B1 * | 9/2004 | McGhie | ............. | 280/426 |
| 7,086,660 B2 * | 8/2006 | Bruening et al. | ............. | 280/442 |
| 2004/0000772 A1 * | 1/2004 | Bruening et al. | ............. | 280/442 |
| 2005/0121878 A1 * | 6/2005 | Muldoon | ............. | 280/426 |
| 2008/0048414 A1 * | 2/2008 | Van Mill et al. | ............. | 280/426 |

\* cited by examiner

*Primary Examiner*—Lesley Morris
*Assistant Examiner*—Marlon A Arce
(74) *Attorney, Agent, or Firm*—Ted Masters

(57) ABSTRACT

A steering system for a tractor and trailer includes first and second sender cylinders which are turned 180° with respect to each other, and first and second receiver cylinders which are turned 180° with respect to each other. First and second front link members connect the first and second sender cylinders to a front equalizer arm, and first and second rear link members connect the first and second receiver cylinders to a rear equalizer arm. The pistons of the cylinders travel in straight paths experiencing no side loads, and each piston travels the same distance as the tractor turns with respect to the trailer.

20 Claims, 6 Drawing Sheets

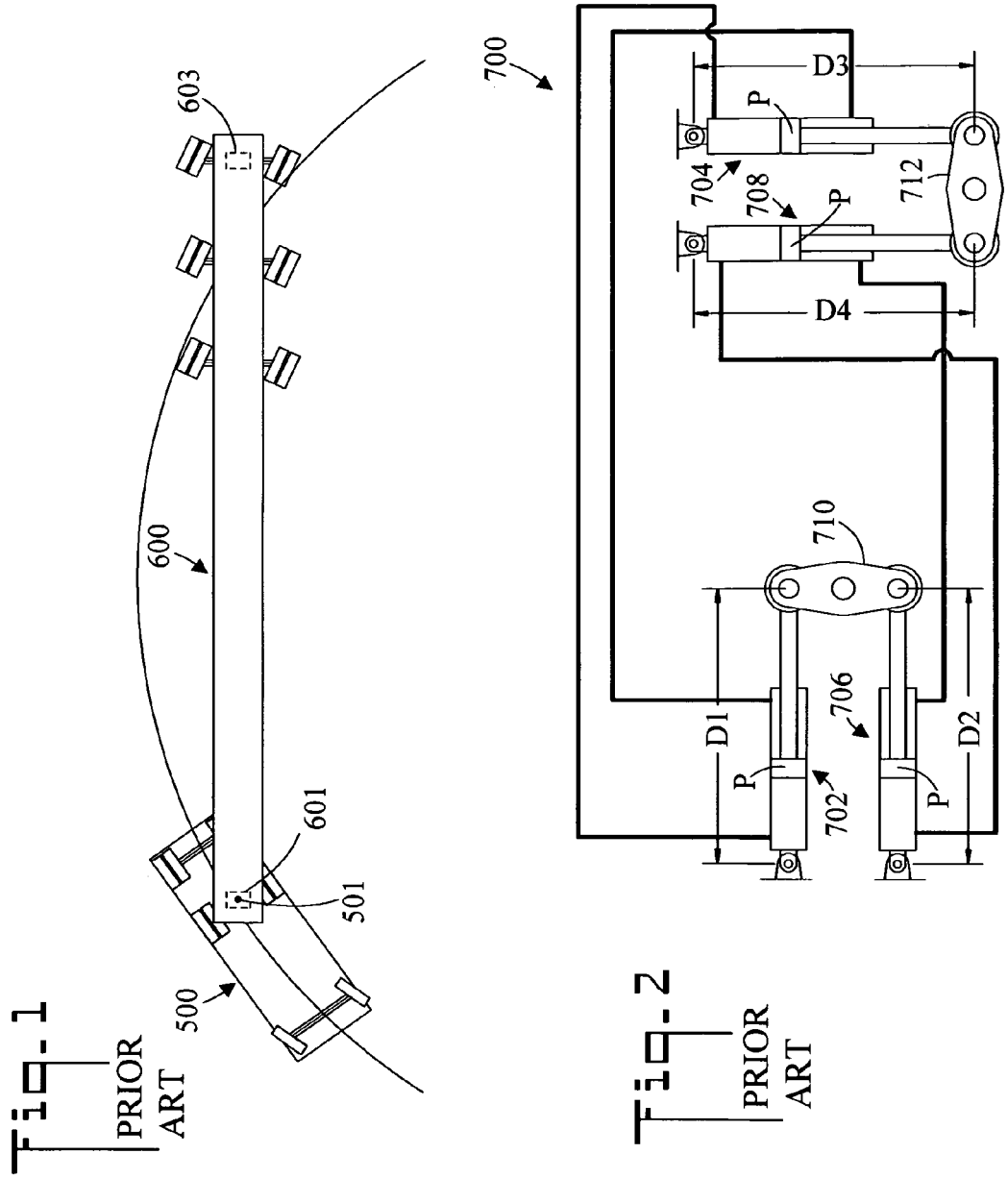

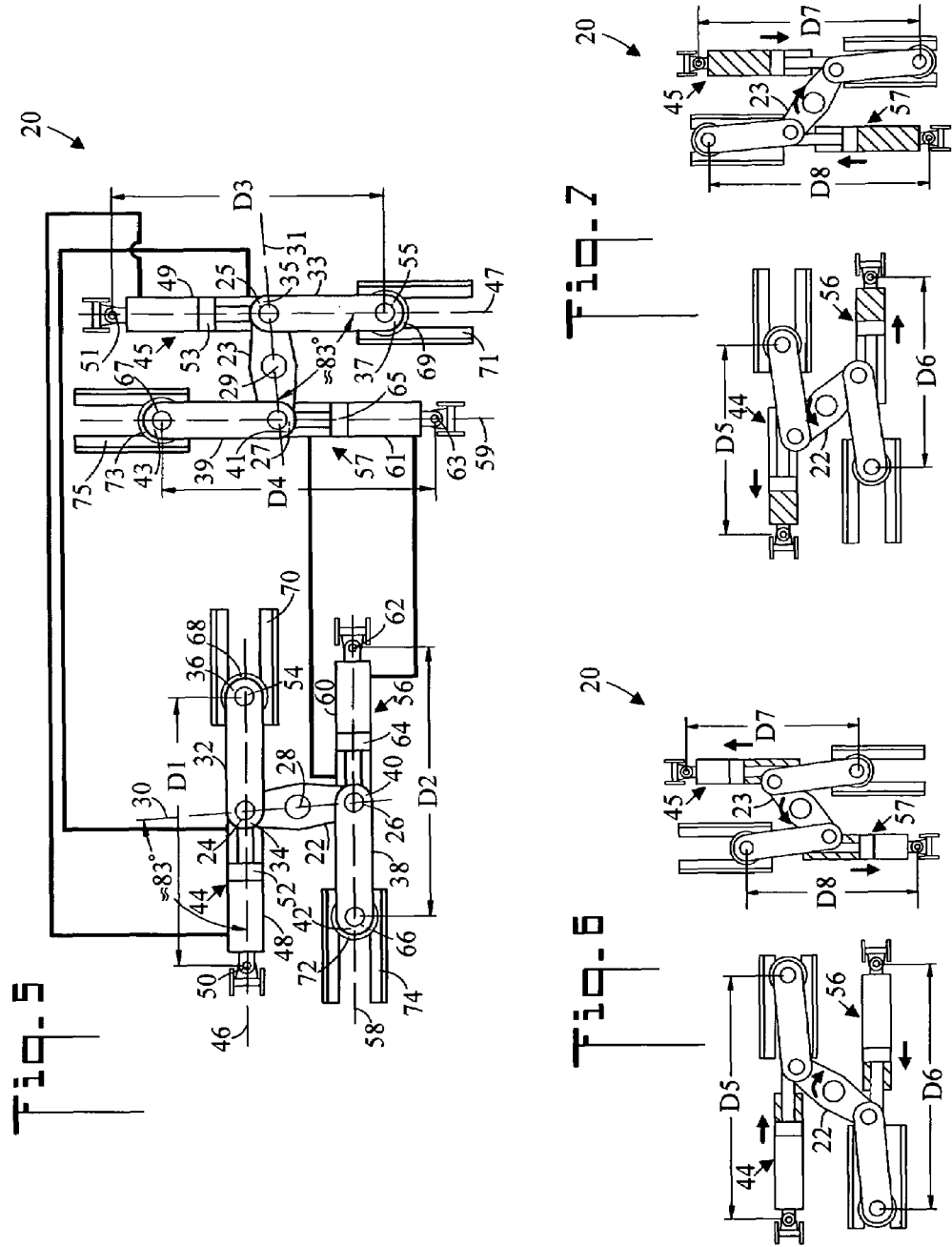

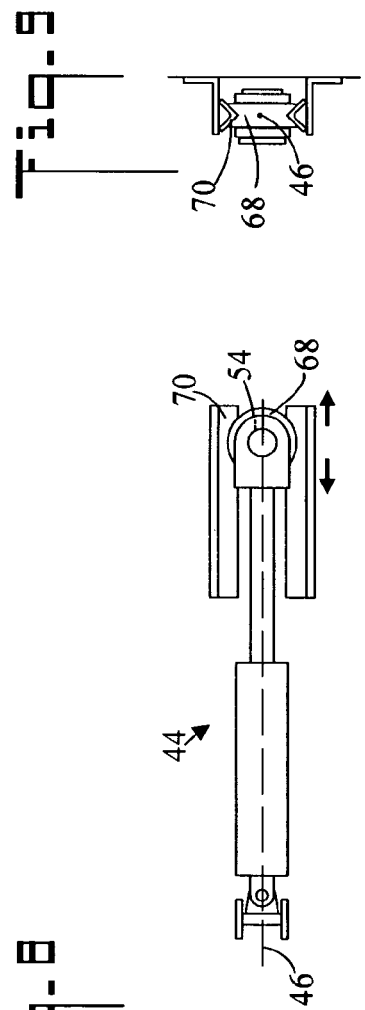
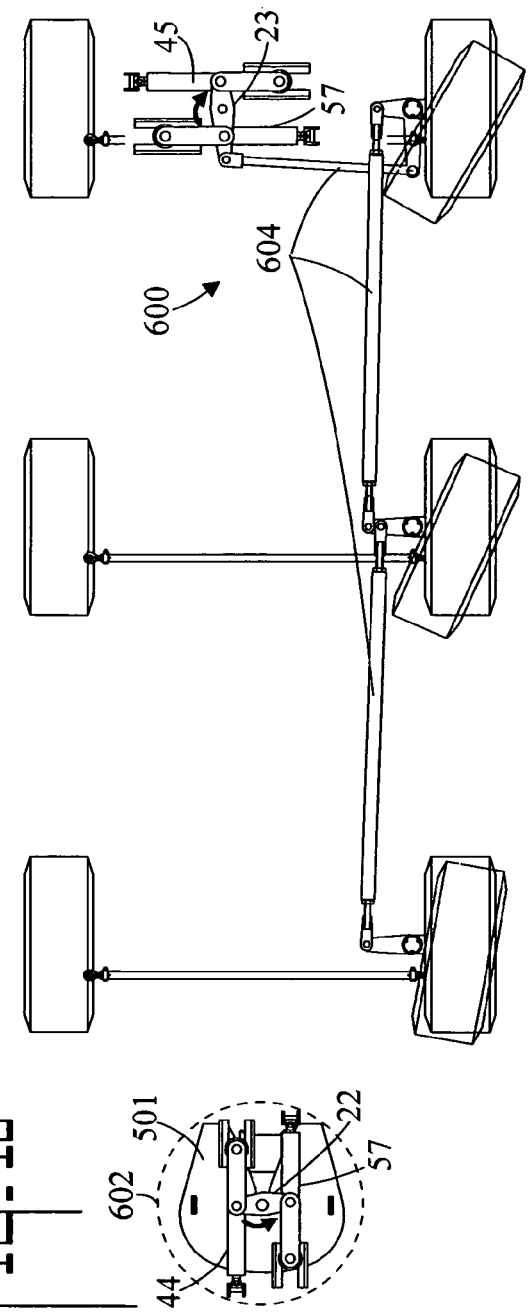

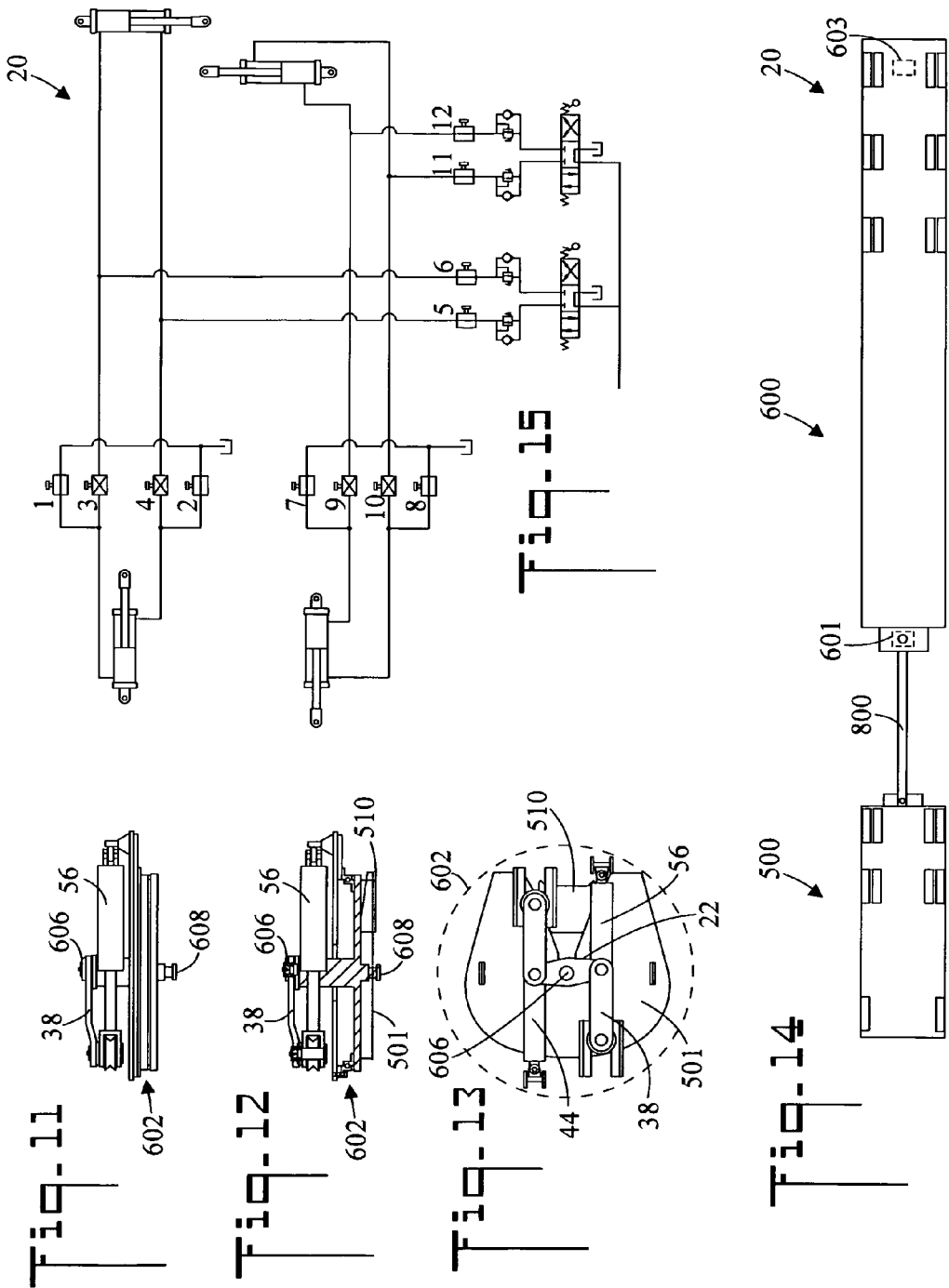

STEERING SYSTEM FOR A TRACTOR AND TRAILER

CROSS REFERENCE TO RELATED APPLICATION

This application claims the filing benefit under 35 U.S.C. §119(e) of U.S. Provisional Application No. 60/931,431, filed May 23, 2007, which is herein incorporated by reference.

TECHNICAL FIELD

The present invention pertains generally to tractors which tow trailers, and more particularly to an apparatus for improving the steering of tractor and trailer combination.

BACKGROUND OF THE INVENTION

As trailers and trailer loads have gotten larger, it has become increasing more difficult to steer the trailers. The larger loads in combination with the typical 40-80 foot trailer length produce increased steering-related forces and often result in scuff steering and pavement damage. This is true for both standard highway trailers and 20 foot wide heavy haul trailers, and for both fifth wheel connections and tow bar connections. To improve steering characteristics, some tractor/trailer combinations utilize a sender/receiver hydraulic system wherein steering is sensed at the tractor and hydraulically transmitted to the trailer's steering axles. However, a problem exists with these steering systems. Because of their mechanical configuration the two sending hydraulic cylinders (and the two receiving hydraulic cylinders) do not have equal travel and thereby hinder the performance characteristics of the steering system and can result in system "sponginess" and significantly increased hydraulic pressure. Further, as loads have gotten bigger in size, trailers need to be developed with an improved steering system that would help reduce tare weight (due to less steering-related forces) and have the added benefit of being more pavement-friendly due in part to less resistance in and out of turns.

BRIEF SUMMARY OF THE INVENTION

The present invention is directed to a steering system for standard or heavy haul trailers which reduces tare weight (due to less steering-related forces) and has the added benefit of being more pavement-friendly. This enhancement is important to the end user who needs a trailer with consistent steering characteristics especially in light of the fact that many of the items the trailer may be carrying have a high center of gravity.

The present invention effectively eliminates system sponginess and lowers hydraulic pressure by allowing identical travel distance on each hydraulic cylinder, and does so without placing any transverse or vertical loads upon the cylinders. This ensures positive pressure at all times in all hydraulic cylinders. As a result, the present invention alleviates the tendency of the trailer's steering to get out of phase, especially in sharper turns. The principles of the present invention may be applied to both standard and heavy haul trailers, and both fifth wheel and tow bar steering. The steering system of the present invention in combination with trailer fifth wheel or tow bar actuation, results in more consistent steering characteristics as well the turning and tare weight advantages.

The steering system of the present invention alleviates the problem of a hydraulically steered trailer to get out of phase. This results in the following:
Reduced system side sway.
Enhanced consistent steering performance (no sponginess)
Enhanced turning ability
Lower trailer tare weight required
Increased steering safety.

In accordance with a preferred embodiment of the invention, a steering system for a tractor and trailer includes a first sender cylinder having a longitudinal axis, a second sender cylinder having longitudinal axis, and a front equalizer arm. A first front link member rotatably connects the first sender cylinder to the front equalizer arm, and a second front link member rotatably connects the second sender cylinder to the front equalizer arm. The system also includes a first receiver cylinder having a longitudinal axis, a second receiver cylinder having a longitudinal axis, and a rear equalizer arm. A first rear link member rotatably connects the first receiver cylinder to the rear equalizer arm, and a second rear link member rotatably connects the second receiver cylinder to the rear equalizer arm.

In accordance with an aspect of the invention, the longitudinal axis of the first sender cylinder is parallel to the longitudinal axis of the second sender cylinder, and the second sender cylinder is turned 180° with respect to the first sender cylinder.

In accordance with another aspect of the invention, the longitudinal axis of the first receiver cylinder is parallel to the longitudinal axis of the second receiver cylinder, and the second receiver cylinder is turned 180° with respect to the first receiver cylinder.

In accordance with another aspect of the invention, the first sender cylinder has a piston end, and the second sender cylinder has a piston end. When the front equalizer arm rotates, the piston end of the first sender cylinder travels the same distance as the piston end of the second sender cylinder.

In accordance with another aspect of the invention, the first receiver cylinder has a piston end, and the second receiver cylinder has a piston end. When the rear equalizer arm rotates, the piston end of the first receiver cylinder travels the same distance as the piston end of the second receiver cylinder.

In accordance with another aspect of the invention, the front equalizer arm has a range of rotation from about 90° left to about 90° right, and the rear equalizer arm has a range of rotation from about 90° left to about 90° right.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a simplified top plan view of a turning tractor and trailer;

FIG. 2 is a top plan view of a prior art steering system for a tractor and trailer;

FIG. 5 is a top plan view of the steering system for a tractor and trailer in accordance with the present invention;

FIG. 6 is a top plan view showing the steering system rotated to the right;

FIG. 7 is a top plan view showing the steering system rotated to the left;

FIG. 8 is an enlarged top plan view of a sender cylinder, a rotating member, and a guide member;

FIG. 9 is an enlarged end elevation view of the rotating member and the guide member;

FIG. 10 is a top plan view of the steering system connected to the axle of the trailer;

FIG. 11 is a side elevation view of the trailer components of the system;

FIG. 12 is a cut away side elevation view of the system connected to the fifth wheel;

FIG. 13 is a top plan view of the fifth wheel connection;

FIG. 14 is a top plan view of the steering system connected to a tractor, tow bar and trailer;

FIG. 15 is an hydraulic schematic diagram of the steering system;

DETAILED DESCRIPTION OF THE INVENTION

Figures 3, 4:
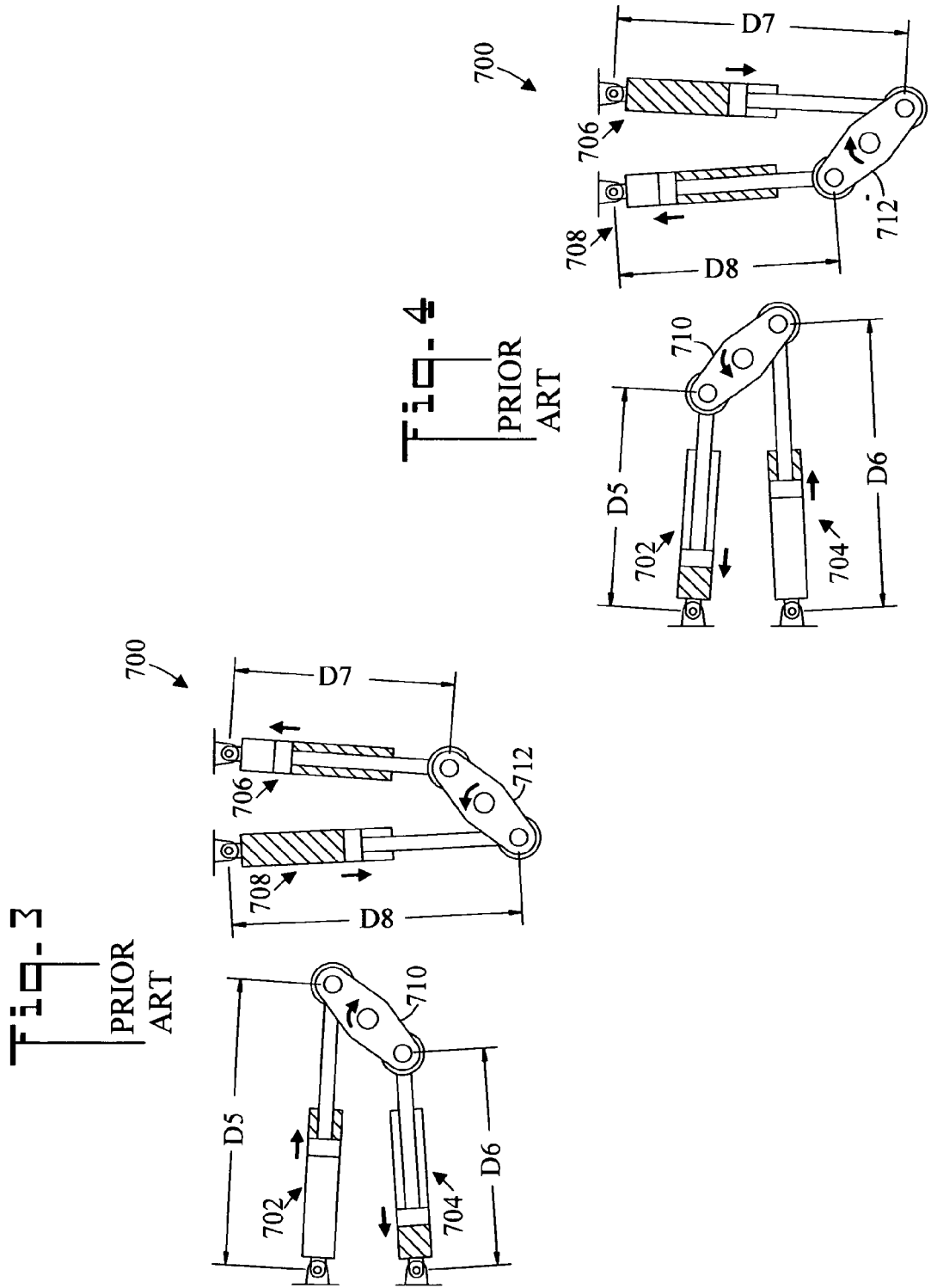
FIG. 3 is a top plan view showing the prior art steering system rotated to the right.
FIG. 4 is a top plan view showing the prior art steering system rotated to the left.

Referring initially to FIG. 1, there is illustrated a simplified top plan view of a turning tractor 500 and trailer 600. Standard trailers currently have turning characteristics which are less than optimum such as large turning radius, scuff steering on tires, etc. Standard trailers also have the added drawback of being pavement unfriendly. In response to this, trailers were developed in Europe with rear steer capability as depicted in FIG. 1. These systems consist of a tractor 500 having a fifth wheel connection 501. "Sender cylinders" 601 (also refer to FIG. 2) are located at the fifth wheel connection 501. "Receiver cylinders" 603 (also refer to FIG. 2) are located at the rear of the trailer 600 and steer the trailer's axles. As the tractor 500 turns, the turn actuates the sender cylinders 601, which send hydraulic oil to actuate the receiver cylinders 603 at the rear axles of the trailer 600. The receiver cylinders 603 in turn cause the rear axles of the trailer 600 to be steered. In some applications, where more axles may be required, more than one pair of sender cylinders 601 and receiver cylinders 603 are utilized. It is noted that if the tractor wheels steer left the steering system causes the trailer wheels to steer right, and visa versa.

FIG. 2 is a top plan view of a prior art steering system for a tractor 500 and trailer 600, the system generally designated as 700. Steering system 700 has two hydraulically independent sender/receiver systems. First sender cylinder 702 drives first receiver cylinder 704, and second sender cylinder 706 drives second receiver cylinder 708. The bold lines denote the hydraulic lines which connect the cylinders, and the cylinders are shown in breakaway view to show the pistons P. For example, hydraulic fluid is free to flow between the piston end of sender cylinder 702 and the piston end of receiver cylinder 704. Therefore, as equalizer arm 710 rotates to the right, fluid is forced from the piston end of sender cylinder 702 to the piston end of receiver cylinder 704. It is noted that the two sender cylinders 702 and 706 are oriented in the same direction, and that the two receiver cylinders 704 and 708 are also oriented in the same direction. First sender cylinder 702 and second sender cylinder 706 are mechanically connected to opposite ends of rotating front equalizer arm 710. Both hydraulic systems (702/704 and 706/708) cause the rear axle(s) to turn in the same direction, thus if a failure should occur in either system the other system would function normally and be capable of performing full steering requirements. In other words, a redundancy is built into the steering system. In FIG. 2 the sender cylinders 702 and 706, and the receiver cylinders 704 and 708 are shown in the "straight ahead" position (i.e. with tractor 500 moving straight ahead and tractor 500 and trailer 600 longitudinally aligned). In this position first and second sender cylinders 702 and 706 have lengths (from the barrel end of the cylinder to the piston end (far end) of the piston) of D1 and D2 respectively, wherein D1=D2. Similarly first and second receiver cylinders 704 and 708 have lengths of D3 and D4 respectively, wherein D3=D4.

At the fifth wheel connection, sender cylinders 702 and 706 are physically attached to trailer 600, and front equalizer arm 710 is attached to tractor 500. As tractor 500 turns with respect to trailer 600, front equalizer arm 710 rotates and moves the pistons of the sender cylinders 702 and 706. Put another way, front equalizer arm 710 senses the difference in angular position of tractor 500 and trailer 600. This piston movement is hydraulically transmitted via hydraulic lines (shown in bold) to receiver cylinders 704 and 708, which in turn cause rear equalizer arm 712 to rotate the same amount as front equalizer arm 710, however in the opposite direction (refer to FIGS. 3 and 4 and the associated discussions). Rear equalizer arm 712 is linked to the rear wheels and causes them to turn (refer to FIG. 10 and the associated discussion). Ideally as the tractor 500 turns the piston travel in both first sender cylinder 702 and second sender cylinder 706 would be equal. However, due to the mechanical geometry of the cylinder/equalizer arm connection this is not the case as will be discussed under FIG. 3 below.

FIG. 3 is a top plan view showing the prior art steering system rotated to the right (clockwise). It is noted that the bold hydraulic lines of FIG. 2 have been removed for clarity. It is also noted that the hatched portion of the sender and receiver cylinders denote the pressure side of the cylinder. FIG. 3 illustrates the difference in travel inherent in a typical prior art hydraulic steering system 700. For example, in the straight ahead position (refer to FIG. 2) first and second sender cylinders 702 and 706 have an overall length of D1=D2=35.25 inches. However, in the right turn position of FIG. 3, front equalizer arm 710 has rotated 45° to the right. This causes first sender cylinder 702 to lengthen to 40.14 inches (D5), and second sender cylinder 706 to shorten to 30.48 inches (D6). It is noted that in prior art steering system 700 the sender (702 and 706) and receiver (704 and 708) cylinders rotate at their hinged barrel ends as equalizer arms 710 and 712 rotate. Thus the piston end of first sender cylinder 702 has traveled D5−D1 or 40.14−35.25=4.89 inches, while the piston end of second sender cylinder 706 has traveled D1−D6 or 35.25−30.48=4.77 inches. That is, there is a 4.899−4.77=0.12 inch difference in piston movement between the two sender cylinders. This difference in piston travel occurs because steering system 700 is mechanically connected (via equalizer arm 710) in a manner which does geometrically not allow for equal travel of the pistons.

Since hydraulic oil is non-compressible, first sender cylinder 702 will go into a negative hydraulic pressure mode. This negative hydraulic pressure mode generates a vacuum in the system, with the possibility of outside air being brought into the cylinder. If this occurs, cylinder 704 will now have to increase its pressure substantially to maintain the torque requirements for steering. This will eventually cause steering misalignment of the axles and the steering will get "spongy" on the trailer, thus reducing overall steering response and creating problem with the handling of the trailer. This steering "sponginess" as it is referred to in the art, basically describes a system that is slower to react to the tractor driver's actions. And, by turning over time and therefore repeatedly occasioning this unequal piston movement, the sender cylinders effectively become misaligned and must periodically be adjusted.

Adjustment takes place by disconnecting the rear steering for the fifth wheel hydraulically and then manually actuating the axle hydraulics to realignment purposes. In addition to the aforementioned system-related issues, this adjustment process is relatively time consuming.

A similar difference in piston travel distance exists at receiver cylinders 704 and 708 wherein D8–D4 is not equal to D3–D7. Also, turning to the left (counterclockwise) as shown in FIG. 4 results in a similar but opposite inequality in travel of the sender and receiver pistons.

FIG. 5 is a top plan view of the steering system for a tractor 500 and trailer 600 in accordance with the present invention, generally designated as 20. The present invention also employs two independent hydraulic steering systems. However in the present invention the two sender cylinders face in the opposite direction and the two receiver cylinders also face in the opposite direction. Links connect the far end of the cylinder pistons to the equalizer arm. Also, the far ends of the pistons are connected to a pulley which moves along a straight channel created by "V" blocks As such, the cylinders remain fixed and do not have to rotate during a turn as in the prior art system. The result of this mechanical configuration is that all four pistons travel exactly the same distance during a turn. In the present invention at the sending end the rotary motion of the front equalizer arm is transferred into straight linear motion of the sender cylinder pistons so that no transverse forces are applied to the sending cylinders. Similarly at the receiving end, the straight linear motion of the receiving cylinder pistons is transferred into rotary motion of the rear equalizer arm.

System 20 includes a front equalizer arm 22 having a first end 24, an opposite second end 26, a center portion 28, and a longitudinal axis 30. Front equalizer arm 22 rotates about center portion 28 when tractor 500 turns. A first front link member 32 has a proximal end 34 and an opposite distal end 36, proximal end 34 of first front link member 32 is rotatably connected to first end 24 of front equalizer arm 22. A second front link member 38 has a proximal end 40 and an opposite distal end 42, proximal end 40 of second front link member 38 is rotatably connected to second end 26 of front equalizer arm 22.

A first sender hydraulic cylinder 44 has (1) a longitudinal axis 46, and (2) a barrel 48 (body) having a barrel end 50 and a piston 52 having a piston end 54 (opposite barrel end 50), and piston end 54 of first sender cylinder 44 is rotatably connected to distal end 36 of first front link member 22. A second hydraulic sender cylinder 56 has (1) a longitudinal axis 58, and (2) a barrel 60 having a barrel end 62 and a piston 64 having a piston end 66, piston end 66 of second sender cylinder 56 is rotatably connected to distal end 42 of second front link member 38. Longitudinal axis 46 of first sender cylinder 44 is parallel to longitudinal axis 58 of second sender cylinder 56, and first sender cylinder 44 is oriented opposite to second sender cylinder 56. That is, first 44 and second 56 sender cylinders are longitudinally turned 180° with respect to each other. As with FIG. 2, in FIG. 5 hydraulic lines are shown in bold.

In the shown embodiment, front equalizer arm 22, first sender cylinder 44, and second sender cylinder 56 are disposed on trailer 600 at the fifth wheel 501 (refer to FIGS. 11-13). However, these component may also be disposed on trailer 600 at the connection with a tow bar (refer to FIG. 14 and the associated discussion).

Front equalizer arm 22 has a straight ahead position (tractor 500 and trailer 600 longitudinally aligned) as shown in FIG. 5. In an embodiment of the invention, when front equalizer arm 22 is in the straight ahead position, longitudinal axis 30 of front equalizer arm 22 and longitudinal axis 46 of first sender cylinder 44 form an angle of about 83°. Also in the shown straight ahead position, first sender cylinder 44 has a length D1, and second sender cylinder 56 has a length D2 which is equal to length D1.

A first rotating member 68 is connected to piston end 54 of first sender cylinder 44. An elongated first guide member 70 rollably receives first rotating member 68. First guide member 68 has a longitudinal axis which is coincident with longitudinal axis 46 of first sender cylinder 44. Because of this alignment, the piston 52 and piston end 54 of first sender cylinder 44 travel along longitudinal axis 46 and are not exposed to any side loading such as exists with the rotating sender cylinders of the prior art steering system 700 (refer to FIGS. 3 and 4). A second rotating member 72 is connected to piston end 66 of second sender cylinder 56. A second guide member 74 rollably receives second rotating member 72. Second guide member 74 has a longitudinal axis which is coincident with longitudinal axis 58 of second sender cylinder 56. In the shown embodiment, first 68 and second 72 rotating members each have a circumferential v-shaped groove, and first 70 and second 72 guide members each having a pair of v-shaped members which engage the v-shaped grooves (refer also to FIGS. 8 and 9).

System 20 also includes a rear equalizer arm 23 having a first end 25, an opposite second end 27, a center portion 29, and a longitudinal axis 31. A first rear link member 33 has a proximal end 35 and an opposite distal end 37, proximal end 35 of first rear link member 33 is rotatably connected to first end 25 of rear equalizer arm 23. A second rear link member 39 has a proximal end 41 and an opposite distal end 43, proximal end 41 of second rear link member 39 is rotatably connected to second end 27 of rear equalizer arm 23.

A first receiver hydraulic cylinder 45 has (1) a longitudinal axis 47, and (2) a barrel 49 (body) having a barrel end 51 and a piston 53 having a piston end 55 (opposite barrel end 51), and piston end 55 of first receiver cylinder 45 is rotatably connected to distal end 37 of first rear link member 23. A second hydraulic receiver cylinder 57 has (1) a longitudinal axis 59, and (2) a barrel 61 having a barrel end 63 and a piston 65 having a piston end 67, piston end 67 of second receiver cylinder 57 is rotatably connected to distal end 43 of second rear link member 39. Longitudinal axis 47 of first receiver cylinder 45 is parallel to longitudinal axis 59 of second receiver cylinder 57, and first receiver cylinder 45 is oriented opposite to second receiver cylinder 57. That is, first 45 and second 57 receiver cylinders are longitudinally turned 180° with respect to each other. As with FIG. 2, in FIG. 5 hydraulic lines are shown in bold. In the shown embodiment, rear equalizer arm 23, first receiver cylinder 45, and second receiver cylinder 57 are disposed on the rear axle of trailer 600 (refer to FIG. 10). It is noted that first sender cylinder 44 is hydraulically connected to first receiver cylinder 45, and second sender cylinder 56 is hydraulically connected to second receiver cylinder 57.

Rear equalizer arm 23 has a straight ahead position (tractor 500 and trailer 600 longitudinally aligned) as shown in FIG. 5. In an embodiment of the invention, when rear equalizer arm 23 is in the straight ahead position, longitudinal axis 31 of rear equalizer arm 23 and longitudinal axis 47 of first receiver cylinder 45 form an angle of about 83°. Also in the shown straight ahead position, first receiver cylinder 45 has a length D3, and second receiver cylinder 57 has a length D4 which is equal to length D3.

A first rotating member 69 is connected to piston end 55 of first receiver cylinder 45. An elongated first guide member 71 rollably receives first rotating member 69. First guide member 69 has a longitudinal axis which is coincident with longitudinal axis 47 of first receiver cylinder 45. Because of this alignment, the piston 53 and piston end 55 of first receiver cylinder 45 travel along longitudinal axis 47 and are not exposed to any side loading such as exists with the rotating sender cylinders of the prior art steering system 700 (refer to FIGS. 3 and 4). A second rotating member 73 is connected to piston end 67 of second receiver cylinder 57. A second guide member 75 rollably receives second rotating member 73. Second guide member 75 has a longitudinal axis which is coincident with longitudinal axis 59 of second receiver cylinder 57. In the shown embodiment, first 69 and second 73 rotating members each have a circumferential v-shaped groove, and first 71 and second 73 guide members each having a pair of v-shaped members which engage the v-shaped grooves.

FIG. 6 is a top plan view showing steering system 20 rotated to the right (tractor 500 has turned to the right). It is noted that the hydraulic lines of FIG. 5 have been removed for clarity. It is also noted that the hatched portion of the sender and receiver cylinders denote the pressure side of the cylinder. As tractor 500 turns right, front equalizer arm 22 rotates causing first sender cylinder 44 and second sender cylinder 56 to deliver pressurized hydraulic fluid to first receiver cylinder 45 and second receiver cylinder 57 respectively. This causes the pistons of first receiver cylinder 45 and second receiver cylinder 57 to rotate rear equalizer arm 23 (in push-pull fashion), which in turn rotates the rear axles of trailer 600 (refer to FIG. 10 and the associated discussion). Referring also to FIG. 5, when front equalizer arm 22 rotates, the piston end 54 of first sender cylinder 44 travels the same distance as piston end 66 of second sender cylinder 56. That is, D5−D1=D6−D2. Also, when rear equalizer arm 23 rotates, piston end 55 of first receiver cylinder 45 travels the same distance as piston end 67 of second receiver cylinder 57. That is, D3−D7=D4−D8. And in fact, all four pistons travel the same distance.

FIG. 7 is a top plan view showing steering system 20 rotated to the left (tractor 500 has turned to the left). As tractor 500 turns right, front equalizer arm 22 rotates causing first sender cylinder 44 and second sender cylinder 56 to deliver pressurized hydraulic fluid to first receiver cylinder 45 and second receiver cylinder 57 respectively. This cause the pistons of first receiver cylinder 45 and second receiver cylinder 57 to rotate rear equalizer arm 23 (in push-pull fashion), which in turn rotates the rear axles of trailer 600 (refer to FIG. 10 and the associated discussion). Referring also to FIG. 5, when front equalizer arm 22 rotates, the piston end 54 of first sender cylinder 44 travels the same distance as piston end 66 of second sender cylinder 56. That is, D1−D5=D2−D6. Also, when rear equalizer arm 23 rotates, piston end 55 of first receiver cylinder 45 travels the same distance as piston end 67 of second receiver cylinder 57. That is, D7−D3=D8−D4. And in fact, all four pistons travel the same distance.

FIGS. 8 and 9 are enlarged top plan and end elevation views respectively of first sender cylinder 44, rotating member 68, and a guide member 70. Piston end 54 is rotatably connected to rotating member 68 and rollably travels along guide member 70. In the shown embodiment the rotating member has a grooved pulley shape which is rollably received by two v-shaped members disposed on guide member 70. Because guide member 70 is aligned with first sender cylinder 44 along axis 46, the piston is not subjected to any side loading. It may be appreciated that a similar piston travel arrangement exists for each of the cylinders of the present invention.

FIG. 10 is a top plan view of steering system 20 connected to tractor 500 and trailer 600. This connection is functionally the same as that of prior art steering system 700. Sender cylinders 44 and 57 are connected to a turnable bearing 602 which mounts on fifth wheel 501 of tractor 500 (refer also to FIGS. 11-13 and the associated discussions). Receiver cylinders 45 and 57 are mounted on the rear axle of trailer 600. When rear equalizer arm 23 turns under the direction of front equalizer arm 22, a linkage mechanism 604 causes the trailer wheels to turn in a manner well known in the art.

FIG. 11 is a side elevation view of the trailer components of system 20, FIG. 12 is a cut away side elevation view of system 20 connected to the fifth wheel 501, and FIG. 13 is a top plan view of the fifth wheel connection. All sender components (including first 44 and second 56 sender cylinders, front equalizer arm 22, second front link member 38, etc.) are mounted on the top half of a turnable bearing 602 which is connected to trailer 600. Front equalizer arm 22 is connected to actuator tower 606 which is part of the lower half of turnable bearing 602 and king pin 608 (hatched area in FIG. 12). Kingpin 608 is inserted into fifth wheel 501 and a wedge 510 is used to lock the lower half of turnable bearing 602 to fifth wheel 501. Therefore, as tractor 500 turns actuator tower 606 turns front equalizer arm 22 with respect to the sender cylinders 44 and 56. In FIG. 13 turnable bearing is shown in dashed lines so fifth wheel 501 is visible.

FIG. 14 is a top plan view of steering system 20 connected to a tractor 500, tow bar 800 and trailer 600. In this embodiment the sender cylinders 601 are not located at the fifth wheel of tractor 500, but rather at the junction of tow bar 800 and trailer 600. The receiver cylinders 603 are located as before at the rear axle of trailer 600.

FIG. 15 is an hydraulic schematic diagram of steering system 20. The system has three operational positions. They are as follows:

Position 1, Normal tractor actuated fifth wheel steer;

Position 2, Rear axles can be steered manually by disconnecting the fifth wheel cylinders and manually actuating a steering lever;

Position 3, Rear steer is hydraulically disconnected from the fifth wheel to allow manual steering alignment of the trailer axles to the tractor in the straight ahead position.

Manually opening and closing valves 1 through 12 sets the flow direction to achieve the above. Actuation occurs from hydraulic spool valves 13 and 14.

Figure 17:
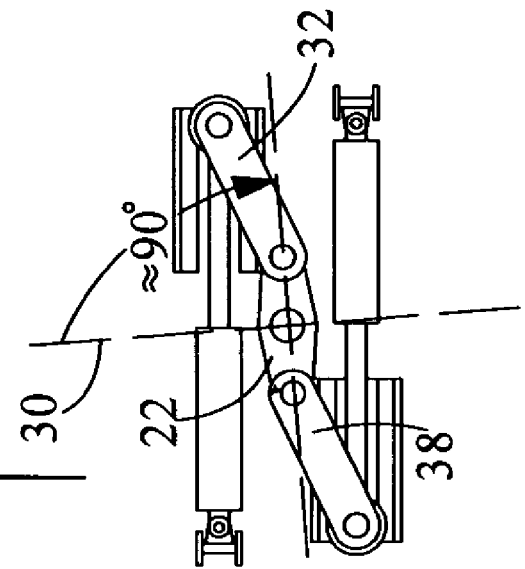
Figure 16:
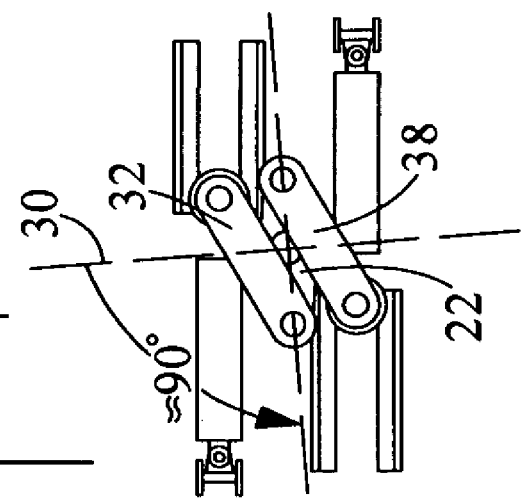
FIG. 16 is a top plan view of the front equalizer arm rotated 90° to the left; and, FIG. 17 is a top plan view of the front equalizer arm rotated 90° to the right.

FIG. 16 is a top plan view of front equalizer arm 22 rotated about 90° to the left, and FIG. 17 is a top plan view of front equalizer arm 22 rotated 90° to the right with respect to the straight ahead position of axis 30 of equalizer arm 22 in FIG. 5. In other words, front equalizer arm 22 has a range of rotation from about 90° left to about 90° right. This large rotation range is made possible by first and second front link members 32 and 38 respectively, and is in sharp contrast to the 45° or less rotation range of prior art steering system 700. It may be appreciated that similarly rear equalizer arm 23 also has a range of rotation from about 90° left to about 90° right. This allows the tractor unlimited steering rotation relative to the trailer of over 90° left or 90° right with a total steering capability of over 180°. This steering capability gives the tractor the ability to avoid objects when traveling in limited space areas such as city streets, off highway locations, power plant facilities, and logging areas.

The preferred embodiments of the invention described herein are exemplary and numerous modifications, variations, and rearrangements can be readily envisioned to achieve an equivalent result, all of which are intended to be embraced within the scope of the appended claims.

We claim:

1. A steering system for a tractor and trailer, comprising:
a front equalizer arm having a first end, an opposite second end, a center portion, and a longitudinal axis, said front equalizer arm rotating about said center portion when the tractor turns;
a first front link member having a proximal end and an opposite distal end, said proximal end of said first front link member rotatably connected to said first end of said front equalizer arm;
a second front link member having a proximal end and an opposite distal end, said proximal end of said second front link member rotatably connected to said second end of said front equalizer arm;
a first sender cylinder having (1) a longitudinal axis, and (2) a barrel having a barrel end and a piston having a piston end, said piston end of said first sender cylinder rotatably connected to said distal end of said first front link member; and,
a second sender cylinder having (1) a longitudinal axis, and (2) a barrel having a barrel end and a piston having a piston end, said piston end of said second sender cylinder rotatably connected to said distal end of said second front link member.

2. The system according to claim 1, further including:
when said front equalizer arm rotates, said piston end of said first sender cylinder traveling the same distance as said piston end of said second sender cylinder.

3. The system according to claim 1, further including:
said front equalizer arm having a straight ahead position; and,
when said front equalizer arm is in said straight ahead position, said longitudinal axis of said front equalizer arm and said longitudinal axis of said first sender cylinder forming an angle of about 83°.

4. The system according to claim 1, further including:
said longitudinal axis of said first sender cylinder being parallel to said longitudinal axis of said second sender cylinder, and said second sender cylinder turned 180° with respect to said first sender cylinder.

5. The system according to claim 1, further including:
a first rotating member connected to said piston end of said first sender cylinder;
a first guide member rollably receives said first rotating member, said first guide member having a longitudinal axis;
a second rotating member connected to said piston end of said second sender cylinder;
a second guide member rollably receives said second rotating member, said second guide member having a longitudinal axis; and,
said longitudinal axis of said first guide member being coincident with said longitudinal axis of said first sender cylinder, and said longitudinal axis of said second guide member being coincident with said longitudinal axis of said second sender cylinder.

6. The system according to claim 5, further including:
said first and second rotating members each having a circumferential v-shaped groove; and,
said first and second guide members each having a pair of v-shaped members which engage said v-shaped grooves.

7. The system according to claim 1, further including:
said front equalizer arm having a range of rotation from about 90° left to about 90° right.

8. The system according to claim 1, further including:
a rear equalizer arm having a first end, an opposite second end, and a center portion, said center portion being rotatable about an axis;
a first rear link member having a proximal end and an opposite distal end, said proximal end of said first rear link member rotatably connected to said first end of said rear equalizer arm;
a second rear link member having a proximal end and an opposite distal end, said proximal end of said second rear link member rotatably connected to said second end of said rear equalizer arm;
a first receiver cylinder having (1) a longitudinal axis, and (2) a barrel having a barrel end and a piston having a piston end, said piston end of said first receiver cylinder rotatably connected to said distal end of said first rear link member;
a second receiver cylinder having (1) a longitudinal axis, and (2) a barrel having a barrel end and a piston having a piston end, said piston end of said second receiver cylinder rotatably connected to said distal end of said second rear link member; and,
said first sender cylinder hydraulically connected to said first receiver cylinder, and said second sender cylinder hydraulically connected to said second receiver cylinder.

9. The system according to claim 8, further including:
when said rear equalizer arm rotates, said piston end of said first receiver cylinder traveling the same distance as said piston end of said second receiver cylinder.

10. The system according to claim 8, further including:
said rear equalizer arm having a straight ahead position; and,
when said rear equalizer arm is in said straight ahead position, said longitudinal axis of said rear equalizer arm and said longitudinal axis of said first receiver cylinder forming an angle of about 83°.

11. The system according to claim 8, further including:
said longitudinal axis of said first receiver cylinder being parallel to said longitudinal axis of said second receiver cylinder, and said second receiver cylinder turned 180° with respect to said first receiver cylinder.

12. The system according to claim 8, further including:
a first rotating member connected to said piston end of said first receiver cylinder;
a first guide member rollably receives said first rotating member, said first guide member having a longitudinal axis,
a second rotating member connected to said piston end of said second receiver cylinder;
a second guide member rollably receives said second rotating member, said second guide member having a longitudinal axis; and,
said longitudinal axis of said first guide member being coincident with said longitudinal axis of said first receiver cylinder, and said longitudinal axis of said second guide member being coincident with said longitudinal axis of said second receiver cylinder.

13. The system according to claim 12, further including:
said first and second rotating members each having a circumferential v-shaped groove; and,
said first and second guide members each having a pair of v-shaped members which engage said v-shaped grooves.

14. The system according to claim 8, further including:
said rear equalizer arm having a range of rotation from about 90° left to about 90° right.

15. The system according to claim 1, further including:
when said front equalizer arm rotates, said piston end of said first sender cylinder traveling the same distance as said piston end of said second sender cylinder;
said longitudinal axis of said first sender cylinder being parallel to said longitudinal axis of said second sender cylinder, and said second sender cylinder turned 180° with respect to said first sender cylinder;
a first rotating member connected to said piston end of said first sender cylinder;
a first guide member rollably receives said first rotating member, said first guide member having a longitudinal axis;
a second rotating member connected to said piston end of said second sender cylinder;
a second guide member rollably receives said second rotating member, said second guide member having a longitudinal axis;
said longitudinal axis of said first guide member being coincident with said longitudinal axis of said first sender cylinder, and said longitudinal axis of said second guide member being coincident with said longitudinal axis of said second sender cylinder;
said first and second rotating members each having a circumferential v-shaped groove;
said first and second guide members each having a pair of v-shaped members which engage said v-shaped grooves;
said front equalizer arm having a range of rotation from about 90° left to about 90° right;
a rear equalizer arm having a first end, an opposite second end, and a center portion, said center portion being rotatable about an axis;
a first rear link member having a proximal end and an opposite distal end, said proximal end of said first rear link member rotatably connected to said first end of said rear equalizer arm;
a second rear link member having a proximal end and an opposite distal end, said proximal end of said second rear link member rotatably connected to said second end of said rear equalizer arm;
a first receiver cylinder having (1) a longitudinal axis, and (2) a barrel having a barrel end and a piston having a piston end, said piston end of said first receiver cylinder rotatably connected to said distal end of said first rear link member;
a second receiver cylinder having (1) a longitudinal axis, and (2) a barrel having a barrel end and a piston having a piston end, said piston end of said second receiver cylinder rotatably connected to said distal end of said second rear link member;
said first sender cylinder hydraulically connected to said first receiver cylinder, and said second sender cylinder hydraulically connected to said second receiver cylinder;
when said rear equalizer arm rotates, said piston end of said first receiver cylinder traveling the same distance as said piston end of said second receiver cylinder;
said longitudinal axis of said first receiver cylinder being parallel to said longitudinal axis of said second receiver cylinder, and said second receiver cylinder turned 180° with respect to said first receiver cylinder;
a first rotating member connected to said piston end of said first receiver cylinder;
a first guide member rollably receives said first rotating member, said first guide member having a longitudinal axis;
a second rotating member connected to said piston end of said second receiver cylinder;
a second guide member rollably receives said second rotating member, said second guide member having a longitudinal axis;
said longitudinal axis of said first guide member being coincident with said longitudinal axis of said first receiver cylinder, and said longitudinal axis of said second guide member being coincident with said longitudinal axis of said second receiver cylinder;
said first and second rotating members each having a circumferential v-shaped groove; and,
said first and second guide members each having a pair of v-shaped members which engage said v-shaped grooves; and,
said rear equalizer arm having a range of rotation from about 90° left to about 90° right.

16. A steering system for a tractor and trailer, comprising:
a front equalizer arm having a first end, an opposite second end, a center portion, and a longitudinal axis, said front equalizer arm rotating about said center portion when the tractor turns;
a first front link member having a proximal end and an opposite distal end, said proximal end of said first front link member rotatably connected to said first end of said front equalizer arm;
a second front link member having a proximal end and an opposite distal end, said proximal end of said second front link member rotatably connected to said second end of said front equalizer arm;
a first sender cylinder having (1) a longitudinal axis, and (2) a barrel having a barrel end and a piston having a piston end, said piston end of said first sender cylinder rotatably connected to said distal end of said first front link member;
a second sender cylinder having (1) a longitudinal axis, and (2) a barrel having a barrel end and a piston having a piston, end, said piston end of said second sender cylinder rotatably connected to said distal end of said second front link member;
a rear equalizer arm having a first end, an opposite second end, and a center portion, said center portion being rotatable about an axis;
a first rear link member having a proximal end and an opposite distal end, said proximal end of said first rear link member rotatably connected to said first end of said rear equalizer arm;
a second rear link member having a proximal end and an opposite distal end, said proximal end of said second rear link member rotatably connected to said second end of said rear equalizer arm;
a first receiver cylinder having (1) a longitudinal axis, and (2) a barrel having a barrel end and a piston having a piston end, said piston end of said first receiver cylinder rotatably connected to said distal end of said first rear link member;
a second receiver cylinder having (1) a longitudinal axis, and (2) a barrel having a barrel end and a piston having a piston end, said piston end of said second receiver cylinder rotatably connected to said distal end of said second rear link member; and,
said first sender cylinder hydraulically connected to said first receiver cylinder, and said second sender cylinder hydraulically connected to said second receiver cylinder;

said first sender cylinder hydraulically connected to said first receiver cylinder, and said second sender cylinder hydraulically connected to said second receiver cylinder; and, when said front equalizer arm rotates, said piston end of said first sender cylinder, said piston end of said second sender cylinder, said piston end of said first receiver cylinder, and said piston end of said second receiver cylinder all traveling the same distance.

17. A steering system for a tractor and trailer, comprising:

a first sender cylinder having a longitudinal axis;

a second sender cylinder having longitudinal axis;

a front equalizer arm;

a first front link member rotatably connecting said first sender cylinder to said front equalizer arm;

a second front link member rotatably connecting said second sender cylinder to said front equalizer arm a first receiver cylinder having a longitudinal axis;

a second receiver cylinder having a longitudinal axis;

a rear equalizer arm;

a first rear link member rotatably connecting said first receiver cylinder to said rear equalizer arm; and, a second rear link member rotatably connecting said second receiver cylinder to said rear equalizer arm.

18. The steering system according to claim 17, further including:

said longitudinal axis of said first sender cylinder being parallel to said longitudinal axis of said second sender cylinder, and said second sender cylinder turned 180° with respect to said first sender cylinder; and, said longitudinal axis of said first receiver cylinder being parallel to said longitudinal axis of said second receiver cylinder, and said second receiver cylinder turned 180° with respect to said first receiver cylinder.

19. The system according to claim 17, further including:

said first sender cylinder having a piston end, and said second sender cylinder having a piston end;

when said front equalizer arm rotates, said piston end of said first sender cylinder traveling the same distance as said piston end of said second sender cylinder;

said first receiver cylinder having a piston end, and said second receiver cylinder having a piston end; and, when said rear equalizer arm rotates, said piston end of said receiver cylinder traveling the same distance as said piston end of said second receiver cylinder.

20. The system according to claim 17, further including:

said front equalizer arm having a range of rotation from about 90° left to about 90° right; and, said rear equalizer arm having a range of rotation from about 90° left to about 90° right.

\* \* \* \* \*

UNITED STATES PATENT AND TRADEMARK OFFICE
CERTIFICATE OF CORRECTION

PATENT NO. : 7,686,320 B1
APPLICATION NO. : 12/082618
DATED : March 30, 2010
INVENTOR(S) : James R. McGhie and Robb I. McGhie Page 1 of 1

It is certified that error appears in the above-identified patent and that said Letters Patent is hereby corrected as shown below:

On the Title Page Item (76) should read,

James R. McGhie ~~U.S.A.~~ United Kingdom

Robb I. McGhie ~~U.S.A.~~ Canada

Signed and Sealed this
Tenth Day of May, 2011

David J. Kappos
*Director of the United States Patent and Trademark Office*